(12) United States Patent
Chowdhury et al.

(10) Patent No.: US 8,594,104 B2
(45) Date of Patent: Nov. 26, 2013

(54) PROVIDING PROXY MOBILE IP OVER A COMMUNICATION NETWORK

(75) Inventors: Kuntal Chowdhury, Andover, MA (US); Robert Marks, New Lenox, IL (US); Rajesh Velandy, Nashua, NH (US); Andrew Gibbs, Andover, MA (US)

(73) Assignee: Cisco Technology, Inc., San Jose, CA (US)

( * ) Notice: Subject to any disclaimer, the term of this patent is extended or adjusted under 35 U.S.C. 154(b) by 305 days.

(21) Appl. No.: 12/952,909

(22) Filed: Nov. 23, 2010

(65) Prior Publication Data

US 2011/0128913 A1 Jun. 2, 2011

Related U.S. Application Data

(60) Provisional application No. 61/263,661, filed on Nov. 23, 2009.

(51) Int. Cl.
*H04L 12/28* (2006.01)
*H04L 12/54* (2013.01)
*H04J 3/16* (2006.01)
*H04J 3/22* (2006.01)
*H04J 3/24* (2006.01)

(52) U.S. Cl.
USPC ......... 370/401; 370/466; 370/467; 370/395.5

(58) Field of Classification Search
None
See application file for complete search history.

(56) References Cited

U.S. PATENT DOCUMENTS

2006/0003765 A1* 1/2006 Patil et al. .................. 455/432.1
2010/0303238 A1* 12/2010 Cakulev et al. .............. 380/272
2011/0238822 A1* 9/2011 Weniger et al. .............. 709/224

* cited by examiner

*Primary Examiner* — Ayaz Sheikh
*Assistant Examiner* — Sori Aga
(74) *Attorney, Agent, or Firm* — Wilmer Cutler Pickering Hale and Dorr LLP

(57) ABSTRACT

Methods and systems for providing interconnection between network operation environments are disclosed in some embodiments. This can include providing interoperability between 3GPP and 3GPP2 standards environments. In one embodiment, a method is disclosed that includes receiving a request from a mobile device for service at a gateway, determining a mode of operation for the mobile device by inspecting an incoming message, wherein the mode of operation includes 3GPP and 3GPP2, establishing a connection using a proxy mobile internet protocol (PMIP), where the type of connection established is dependent on the mode of operation, providing an IP address to a mobile device based on the mode of operation and the parameters associated with the mode of operation, and communicating with an authentication, authorization, and accounting (AAA) server operating in accordance with the mode of operation.

20 Claims, 9 Drawing Sheets

PROVIDING PROXY MOBILE IP OVER A COMMUNICATION NETWORK

CROSS-REFERENCE TO RELATED APPLICATIONS

This application claims benefit under 35 U.S.C. §119(e) of U.S. Provisional Patent Application No. 61/263,661, entitled "Providing Proxy Mobile IP over a Communication Network," filed Nov. 23, 2009, and is hereby incorporated by reference herein in its entirety.

FIELD OF THE DISCLOSURE

This disclosure relates to a system and method for providing connectivity to a mobile device in a communication network.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points. Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology. The range of the wireless communication technology can vary depending on the deployment.

The first generation of wireless telephone technology used analog mobile phones in which analog information signals were modulated and transmitted. In second generation (2G) systems, digital information signals were used to modulate a carrier. These 2G technologies used time division multiplex access (TDMA) technology for GSM systems, or code division multiple access (CDMA) technologies for IS-95 systems to distinguish multiple users. Such networks were further upgraded to handle higher-speed packet data using GPRS/EDGE and then HSPA, and CDMA 1x-EVDO (IS-856) in networks referred to as 2.5G and 3G networks. Generally, two parallel standards were developed for mobile devices with the 3rd Generation Partnership Project (3GPP) developing GSM/UMTS/HSPA and the 3rd Generation Partnership Project 2 (3GPP2) cdmaOne (IS-95)/CDMA2000 (IS-2000)/EVDO (IS-856) technologies. The next evolution is 4G technology, which is referred to as long term evolution-system architecture evolution (LTE-SAE) and uses orthogonal frequency division multiple access (OFDMA) technology. While LTE is being developed under 3GPP, carriers that implement 3GPP2 standards have announced that they intend to use LTE as their 4G solution, rather than a 4G standard developed under 3GPP2. It is expected that carriers that implement 3GPP2 standards would implement LTE while keeping the infrastructure compatible with 3GPP2 standards because there would still be 3G-only (and even 2G-only) compliant users.

DESCRIPTION OF EXAMPLE EMBODIMENTS

Overview

Figure 1:
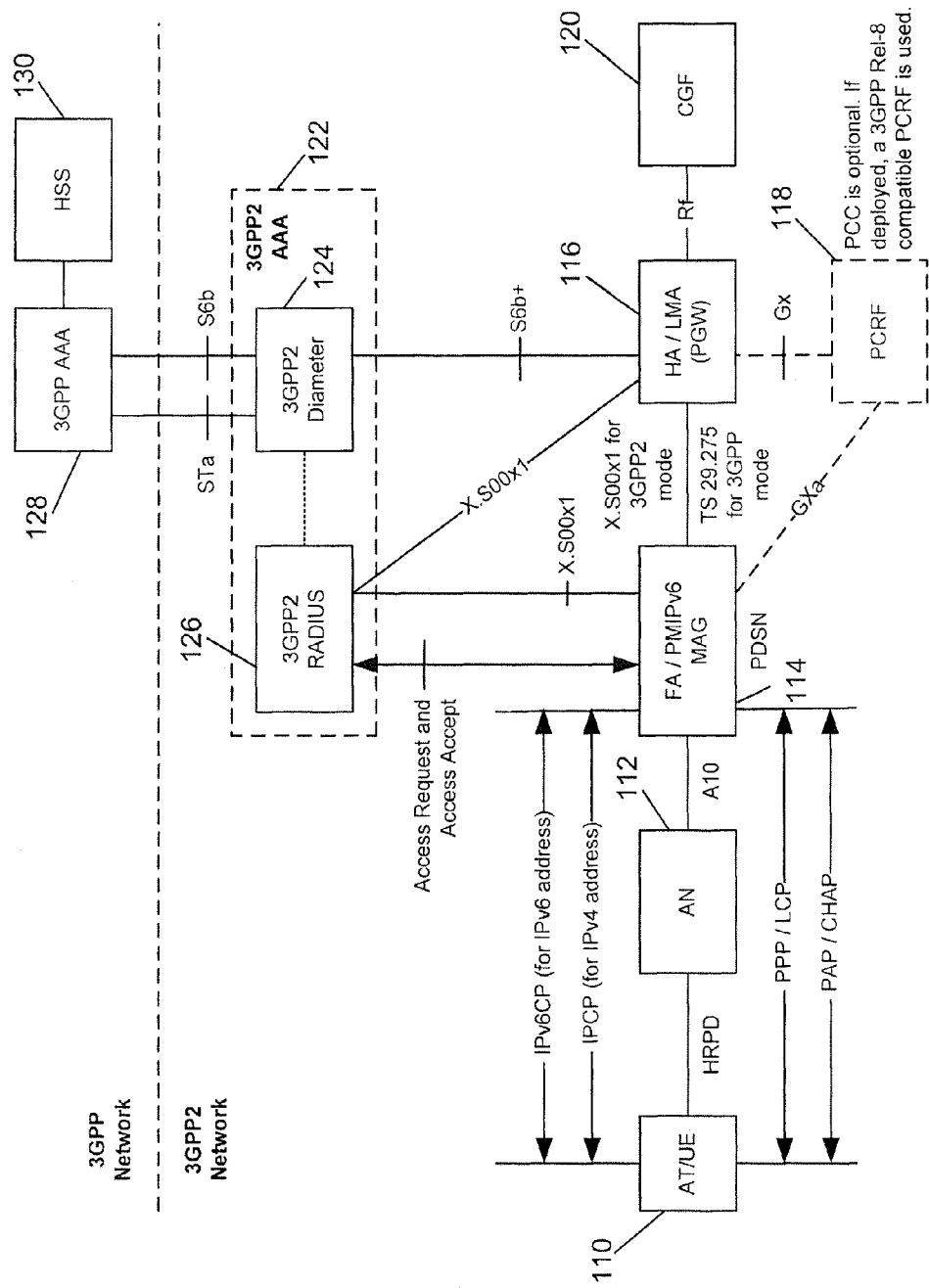
FIG. 1 illustrates a communication network topology in accordance with some embodiments.

Certain embodiments disclose a method including receiving a request from a mobile device for service at a gateway, determining a mode of operation for the mobile device by inspecting an incoming message, wherein the mode of operation includes 3GPP and 3GPP2, establishing a connection using a proxy mobile internet protocol (PMIP), where the type of connection established is dependent on the mode of operation, providing an IP address to the mobile device based on the mode of operation and the parameters associated with the mode of operation, and communicating with an authentication, authorization, and accounting (AAA) server operating in accordance with the mode of operation.

Example Embodiments

Systems and methods for providing connectivity to a mobile device in a communication network are described. Connectivity for a mobile device is provided wirelessly through a radio interface to an access network that can be connected to a core network through a gateway. Generally, different technologies cannot communicate with one another as incompatibility issues can arise. Enhancements can be made to devices in order to provide connectivity between otherwise incompatible communication network components. For example, an access network architecture of one communication network can connect to a core network architecture of a second communication network. This can be provided through certain enhancements to the gateways and protocols to allow communication between the components of the networks.

The connectivity can include an interworking gateway that is implemented to provide service to a mobile node that would not otherwise be able to receive service from a communication network. The service can include connecting a 3GPP2 mobile device to a 3GPP core network without changing the 3GPP2 mobile device. Other types of connectivity are also provided in other embodiments. In providing the connectivity, the interworking gateways can use protocols such as proxy mobile IP to provide service from a 3GPP core network to a 3GPP2 mobile device.

In some embodiments the different technologies involved can include 3GPP2 and 3GPP. One approach to migrating a network implementing 3GPP2 to a network implementing LTE defined under 3GPP is by replacing elements of the existing network using elements of the LTE-SAE architecture. For example, a high rate packet data (HRPD) network implementing 3GPP2 standards can be upgraded to an evolved HRPD (eHRPD) as an initial step to evolve into LTE. This upgrade, however, requires (1) adding an HRPD serving gateway (HSGW) to the core network, (2) modifying the radio access network to accommodate new devices in the core network, and (3) upgrading user entities to be compatible with eHRPD. Therefore, this approach can be highly disruptive to the existing HRPD network, and can be costly to the carrier and the service subscribers. Considering that these upgrades do not provide a long term solution to carriers, this approach may not warrant the high cost and the high risk.

An alternative can be direct LTE, which interworks between access network devices in 3GPP2 and core network devices in LTE. For Direct-LTE, the use of proxy mobile internet protocol (PMIPv6) can be used between 3GPP and 3GPP2 standards environments, and within an evolved packet core (EPC). PMIPv6 can also provide other benefits in the CDMA network between a foreign agent and home agent to resolve IPv4 address exhaustion issues and to provide initial IPv6 and dynamic IPv4 addresses over a common protocol. In some embodiments, PMIPv6 can be extended to allow a direct interconnection from the packet data serving node (PDSN) to a PGW (in the EPC) over an S5/S8 interface. Direct LTE can provide many benefits such as interconnecting CDMA radio access network with a an LTE core, which can allow provision of LTE capabilities to mobile devices and allow roaming back to an LTE carrier through an intermediary network.

The enhancements to the gateways and protocols can be of special interest to 3GPP2 network providers. As 3GPP2 network providers migrate from 3GPP2 to an LTE network implementing 3GPP, network providers are expected to keep the infrastructure compatible with 3GPP2 standards because there would still be 3G-only (and even 2G-only) compliant users. Network providers can achieve backward compatibility while migrating to an LTE by (1) building a network implementing 3GPP adjacent to the existing 3GPP2 network infrastructure and (2) building an intelligent access network that can route the user entity (UE) connections to either the existing 3GPP2 network or the new 3GPP network depending on the protocol under which the UE operates. This approach can also be useful for 3GPP network providers in attracting subscribers using 3GPP2 technology with small amount of investment. This approach can allow network providers to use a common policy, billing, and operator services to network devices operating under different standards, while also allowing the network providers to implement common internet protocol (IP) pools and deliver IPv6 addresses to supported HRPD devices. In addition, this approach can further allow the use of access point name (APN) and packet data network gateway (PGW) assignments or static/dynamic home agent (HA) assignment schemes.

FIG. 1 illustrates a communication network topology in accordance with certain embodiments. FIG. 1 includes an access terminal/user equipment (AT/UE) 110, an access network (AN) 112, an access gateway 114, an anchor gateway 116, a policy and charging rules function (PCRF) 118, a charging gateway function (CGF) 120, a 3GPP2 authentication, authorization, and accounting (AAA) server 122 that includes a 3GPP2 DIAMETER function 124 and a 3GPP2 RADIUS function 126, and a 3GPP AAA 128 and a home subscriber server (HSS) 130. The protocols and gateway devices of FIG. 1 can be used to enhance a 3GPP2 network to interconnect with a 3GPP network. For example, current high rate packet data (HRPD) networks can be enhanced with proxy mobile IP version 6 (PMIPv6) without requiring any changes to existing mobile devices, such as AT/UE 110. In FIG. 1, a 3GPP2 high rate packet data (HRPD) network is interconnected with an evolved packet core (EPC) 3GPP-based network. The architecture supports operation in both 3GPP2 and 3GPP modes, with a mobile device being able to connect to this communication network whether it is 3GPP2 or 3GPP enabled. This interconnectivity can allow an easier migration to long term evolution (LTE) networks for some network operators.

These connectivity enhancements can be provided by an interworking gateway which can be access gateway 114, anchor gateway 116, or a combination of access gateway 114 and anchor gateway 116, depending on the embodiment. The interworking gateway can provide services to mobile devices using simple IP (SIP), mobile IP (MIP), or proxy mobile IP (PMIP) over a point-to-point protocol (PPP) connection and allowing the access gateway to connect to the core network via a 3GPP mode. In some embodiments, simple IP is used to connect the mobile device to the access gateway 114, which is providing PDSN functionalities. In a 3GPP mode, the access gateway 114 can operate as a mobility access gateway (MAG) of the PMIP protocol and can provide PDN connections to an anchor gateway 116 using 3GPP PMIP as defined in TS 29.275. The system can also include enhancements to provide interfaces between an interworking gateway and a 3GPP2 AAA server 122, and from the 3GPP2 AAA server 122 to 3GPP AAA server 128 and HSS 130. The interworking gateway alone or in combination with the other enhancements can provide an easier and more cost effective migration path for HRPD networks towards a network based mobility management system using PMIPv6. In addition, the core network can be implemented along 3GPP standards to provide ease of roaming and network upgradeability, without having to upgrade the AT/UE 110 (the user's device).

As shown, the network topology of FIG. 1 can support a 3GPP2 mobile device such as an access terminal (AT) 110 with the access gateway 114 operating as a packet data serving node (PDSN) and the anchor gateway 116 operating as a home agent (HA)/local mobility anchor (LMA). In some embodiments, the access gateway 114 and the anchor gateway 116 can communicate using simple IP or mobile IP (MIP) (e.g., as defined by X.S0011) and/or using proxy mobile IP (PMIP) (e.g., as defined by X.S0061). Additional functionality can be provided in the access gateway 114 and the anchor gateway 116 to allow it to operate in a 3GPP mode as well. Some of the functionalities provided at the access gateway 114 can be accessed through 3GPP based protocols such as 3GPP-based PMIP. The protocol to be used between the access gateway 114 and the anchor gateway 116 can be identified in initial messaging such as an access accept message.

The anchor gateway 116 can be enhanced to operate as a packet data network gateway (PDN GW). The PDN GW or PGW functionality on the gateway can be provided alongside the HA/LMA functionality, with the operating mode being selected by messages received at the gateway. The messages that determine the operating mode can include a registration request (RRQ) and a proxy binding update (PBU) message. The anchor gateway 116 can use the message itself as an indication of the operating mode, for example, a RRQ message indicates a 3GPP2 operating mode, while a PBU indicates a 3GPP operating mode. The determination can also be based upon how the message is received, for example, the port and the type of connection.

The access gateway 114 to anchor gateway 116 interface can operate according to a variety of protocols to allow interoperability between otherwise incompatible networks. In some embodiments, this interface operates according to MIPv4 (3GPP2 X.S0011), PMIP (3GPP2 X.S0061), or PMIPv6 (3GPP TS 29.275) depending upon the operating mode (e.g., 3GPP2 or 3GPP) identified in the messaging (e.g., an access accept message). When the access gateway is operating in a 3GPP mode it can provide a PMIPv6 mobility access gateway (MAG) functionality, while the anchor gateway provides PGW functionality when operating in a 3GPP mode. The anchor gateway 116 can use RADIUS procedures to communicate authentication, access, security, and accounting information in the 3GPP2 mode, or an S6b interface for communicating authentication, access, security, and accounting information in the 3GPP mode. Selection of the appropriate anchor gateway 116 among a plurality of anchor gateways when operating in a 3GPP mode can be based on the default APN (access point name) identity returned in an access accept message, in some embodiments. Associated with the default APN is a PDN type that controls the number and type of IP address(es) that can be returned by the anchor gateway (operating as a PGW) to the access gateway (operating as a PMIPv6 MAG). The PDN type can be included in messaging between the anchor gateway and the access gateway such as in a proxy binding acknowledgement (PBA) message.

In many embodiments, the AT/UE 110 can be a single mode device. That is, the AT/UE 110 is not enhanced to be compatible between technologies, such as 3GPP and 3GPP2 or LTE and evolved high rate packet data (eHRPD). A number of protocols can be used between AT/UE 110 and access gateway 114 through access network 112. The protocols include point-to-point protocol (PPP) in combination with link control protocol (LCP), password authentication protocol (PAP), and challenge-handshake authentication protocol (CHAP). In setting up IP addresses for the AT/UE 110, internet protocol control protocol (IPCP) can be used for establishing and configuring internet protocol of a PPP link and obtaining one or more IPv4 addresses for the mobile device. For IPv6 based mobile devices, an IPv6CP can be used between the AT/UE 110 and access gateway 114. In some embodiments, when a single mode device attaches to the network, the PDN connection can be established using the default APN configured in HSS 130.

In accordance with certain embodiments, the network can accommodate two modes of operations: 3GPP2 and 3GPP. When an AT 110 requests authentication to an access gateway 114, the access gateway 114 can communicate with AAA 112 to determine the mode of operation. AAA 112 can use a proxy function or a similar method (e.g. combined AAA-HSS complex) to query and retrieve the preferred mode of operation from the home HSS system within the target LTE network. AAA 112 notifies the mode of operation to the access gateway 114 via the 3GPP2 AAA 122. If the determined mode of operation is 3GPP2, the network processes the AT connection as a standard 3GPP2 call, with the access gateway 114 operating as a PDSN and the anchor gateway 116 operating as an HA. If the determined mode of operation is 3GPP, the AT 110 will request an IP address to the access gateway 114 using protocols such as internet protocol control protocol (IPCP) or IPv6CP.

Figure 2:
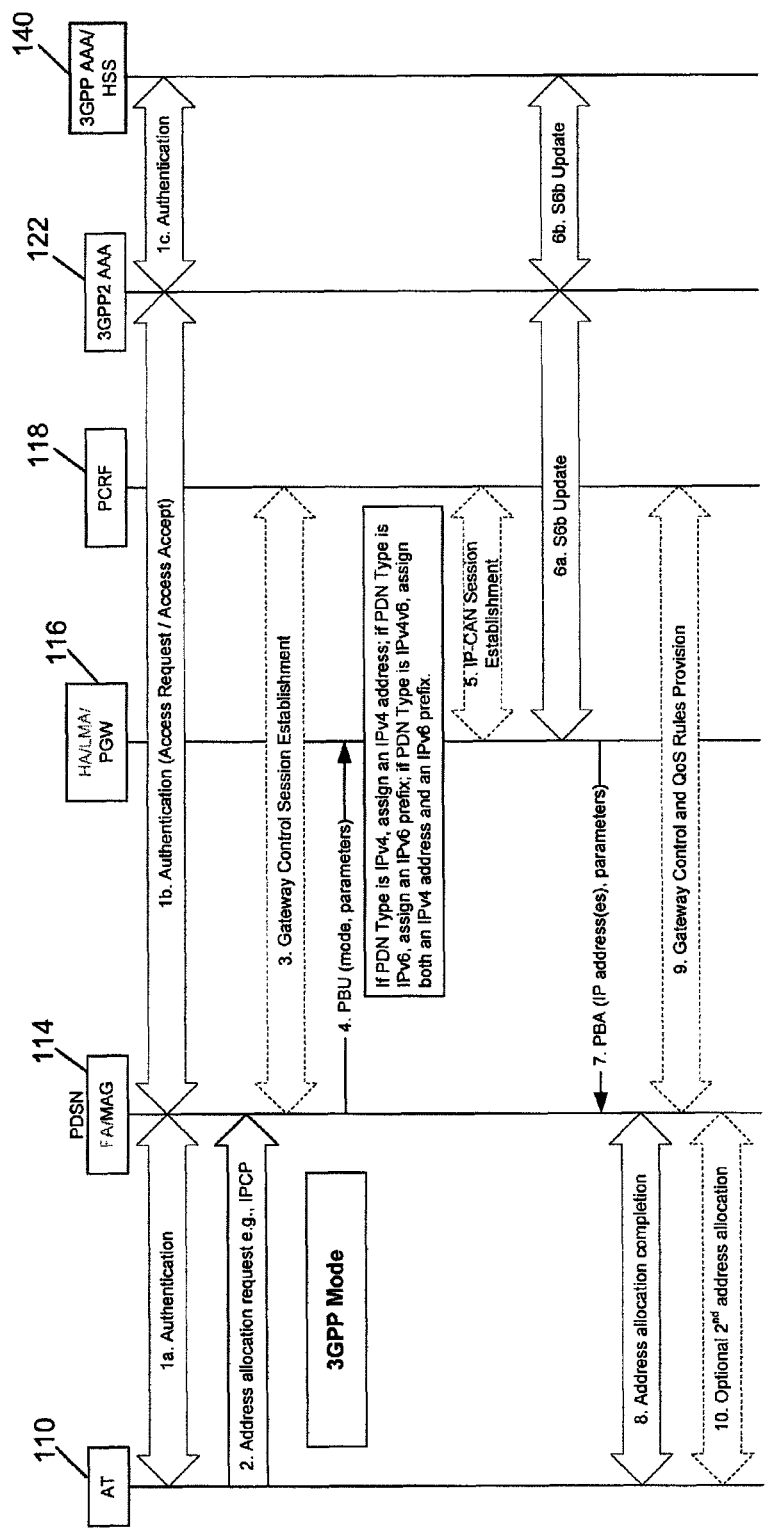
FIG. 2 illustrates a call flow for an initial attachment of a mobile device in accordance with some embodiments.

FIG. 2 illustrates a call flow for an initial attachment of a mobile device in accordance with certain embodiments. FIG. 2 includes an access terminal (AT) 110, an access gateway 114, an anchor gateway 116, a PCRF 118, a 3GPP2 AAA 122, and a 3GPP AAA/HSS 140. FIG. 2 describes a method and system for providing connectivity between a 3GPP2 network and a 3GPP network through the use of 3GPP/3GPP2 operating modes and interworking gateways implementing certain protocols. The protocols can be enhanced and in conjunction with the interworking gateways to allow multiple IP addresses and PDN connections to be supported across network devices to mobile devices that do not typically support such features. Additionally, two methods of accommodating communication with an evolved packet core are described in connection with FIG. 2.

In step 1a, AT 110 authenticates using an identifier. Depending on the technology, the identifier can inform the network how to handle the mobile device and uniquely identify the mobile device to the network. In a HRPD based network, the identifier can be HRPD NAI (network access identifier). The access gateway 114, which can provide HA/MAG/PDSN capabilities, performs an authentication with 3GPP2 AAA 122 in step 1b. The 3GPP2 AAA 122 selects the mode, in this case 3GPP. For 3GPP mode, AAA 122 performs authentication in step 1c with the 3GPP AAA/HSS 140 using a STa interface. AAA 122 can send parameters for both 3GPP2 and 3GPP, which can include a provisioned IMSI (international mobile subscriber identity) associated with the NAI. AAA 122 returns the selected mode and both 3GPP2 and 3GPP parameters to the access gateway 114. One of the 3GPP parameters is the default APN identity and its associated PDN Type.

In step 2, the AT 110 requests an IP address (e.g., using internet protocol control protocol (IPCP) or IPv6CP, which includes PPP and PAP/CHAP). If policy control and charging (PCC) is deployed, the access gateway 114 acting as a PDSN establishes a Gateway Control Session with the PCRF 118 in step 3. The access gateway 114 selects the anchor gateway 116, acting as a PGW, based on the default APN identity in step 4. At this point, one of two methods may be used to obtain an IPv4 address and/or an IPv6 prefix from the selected anchor gateway 116, based on user profile information, which can be obtained from the 3GPP2 AAA 122.

The first method is a combined IP address allocation method. In this method a message is sent to the anchor gateway 116 requesting an IPv4 address and/or an IPv6 prefix authorized by the PDN type. Based on the PDN type (IPv4, IPv6, IPv4v6), the access gateway 114 sends a PBU with additional parameters to the anchor gateway 116, requesting the IPv4 address and/or IPv6 prefix authorized by the PDN type. In step 8, the access gateway 114 returns to the AT 110 either the IPv4 address or IPv6 prefix that was requested in step 2. The binding, however, is refreshed for all addresses/prefixes returned, even if the AT does not request the returned address/prefix in a later step.

The second method is an independent IP address allocation method. In this method an identifier is assigned to an APN to allow for more than one PDN connection. Based on the request in step 2, and if allowed by the PDN type (IPv4, IPv6, IPv4v6), the access gateway 114 sends a PBU with additional parameters to the anchor gateway 116, requesting either the IPv4 address or the IPv6 prefix requested in step 2. In order to overcome the restriction of one PDN connection per APN, the access gateway 116 includes a service identifier with the APN information. In this manner, the IPv4 address binding is independent from the IPv6 prefix binding. In step 7, the PDSN returns to the AT only the IPv4 address or IPv6 prefix that was requested in step 2. Note that when this method is used, step 10 actually represents a repeat of steps 2 through 9.

In step 5, the anchor gateway 116 acting as a PGW allocates IP addresses/prefixes based on the PBU message it received. If PCC is deployed, the anchor gateway establishes an IP-CAN session with the PCRF 118. In step 6, the anchor gateway 116 sends a notification to the 3GPP2 Diameter proxy in AAA 122 which forwards it to the 3GPP AAA 128. In step 7, the anchor gateway 116 returns the allocated IP addresses/prefixes and other parameters to the access gateway 114 in a PBA message. In step 8, the access gateway 114 completes the IP address assignment procedure started in step 2. In step 9, if PCC is deployed, the PCRF 118 may provide QoS rules to the access gateway 114 based on information it received in step 5. In step 10, the AT 110 may request a second IP address (e.g., using IPv6CP). If the combined address allocation method is used, the access gateway 114 received a 2nd IP address in step 7, and the access gateway 114 completes the IP address assignment procedure. If the independent IP address allocation method is used, this request is treated like step 2, and steps 3 thru 9 are repeated using the identifier to keep the addresses independent from one another.

Figure 3:
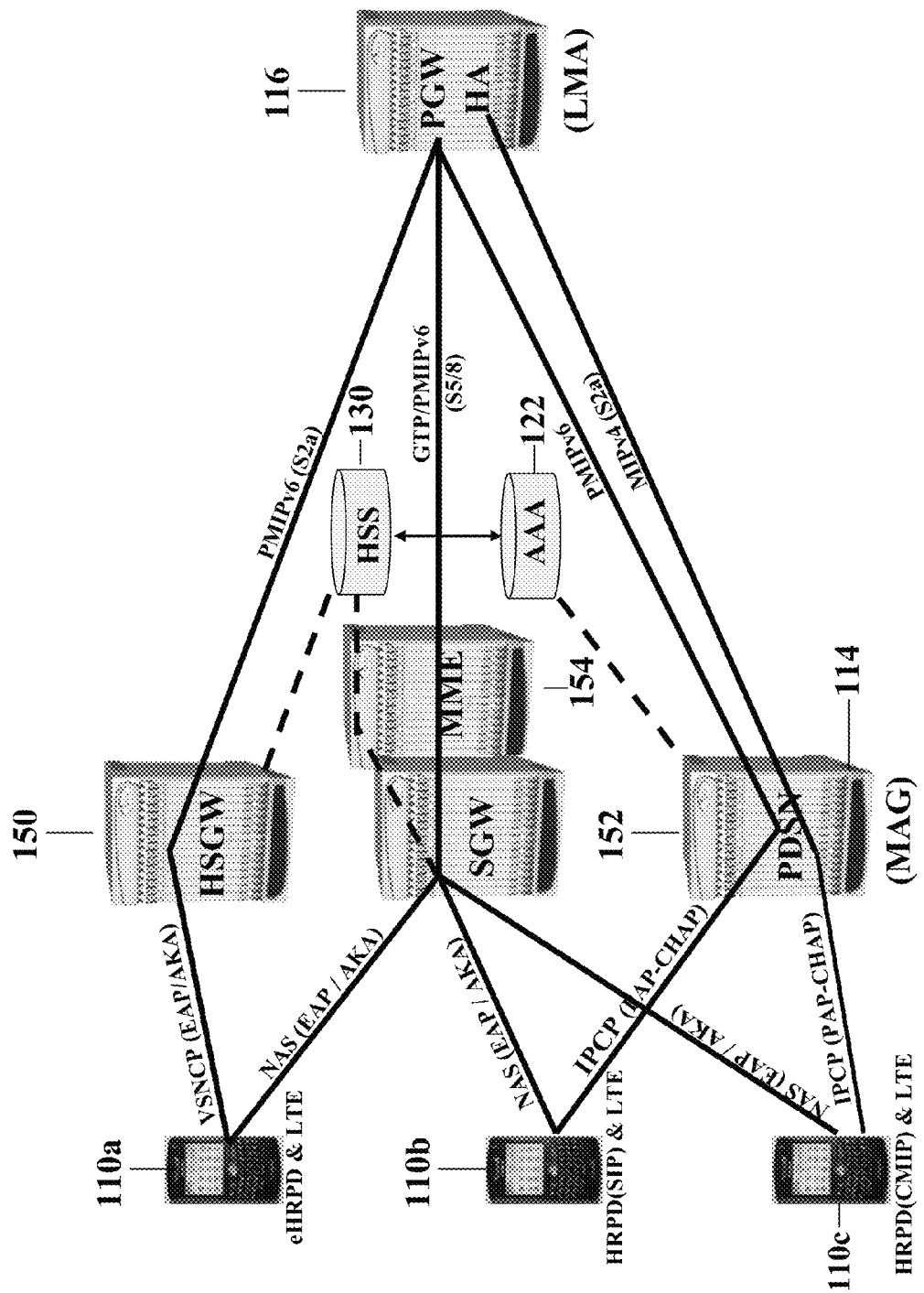
FIG. 3 illustrates a communication network topology in accordance with some embodiments.

FIG. 3 shows a number of example scenarios for accommodating ATs operating under different standards, in accordance with certain embodiments. FIG. 3 includes three ATs 110a-110c, HSGW 150, SGW 152, MME 154, HSS 130, AAA 122, an access gateway 114, and an anchor gateway 116. ATs in FIG. 3 can operate under different standards: LTE, eHRPD, and HRPD. The HRPD ATs can be based on simple IP (SIP) or client mobile IP (CMIP). Suppose that an AT operating under LTE standards (110a) is requesting an IP address. The network can support non-access stratum (NAS) signaling and extensible authentication protocol (EAP)/authentication and key agreement (AKA) authentication to the AT 110a operating in LTE. In this case, EPC can handle the IP address request as defined in LTE standards. Under the LTE standards, the IP anchor point can be the anchor gateway 116, which can be reached using GPRS tunneling protocol (GTP) or PMIPv6 over the S5/S8 interface. If the AT 110a is operating under eHRPD, the AT 110a searches for the HSGW 150 and performs authentication and IP address assignment. In this case, the AT 110a connects to the HSGW over the A10/A11 interface using an upgraded RAN network that advertises the eHRPD service. For the AT 110a operating in eHRPD, the mobile IP anchor point can the anchor gateway 116, which can be reached over the S2a interface via PMIPv6.

If the AT 110 does not support LTE or eHRPD, then the network operates as a standard HRPD. An AT operating under a standard HRPD typically first attempts a CMIP connection. If an AT 110b requests authentication using CMIP, AAA 122 can respond to the request by specifying the mode of operation. If AAA determines to operate in a 3GPP2 mode, then the AT 110b can continue to communicate using CMIP and be connected via MIP to an assigned HA (which can co-located on the anchor gateway 116 in this example in order to enable IP pool sharing.) If AAA determines to operate in a 3GPP mode, then the initial CMIP authentication request can be rejected and the AT can be forced to operate in a simple IP (SIP) mode of operation. The SIP mode allows using PMIPv6 as a transport method back to an EPC core.

Figure 4:
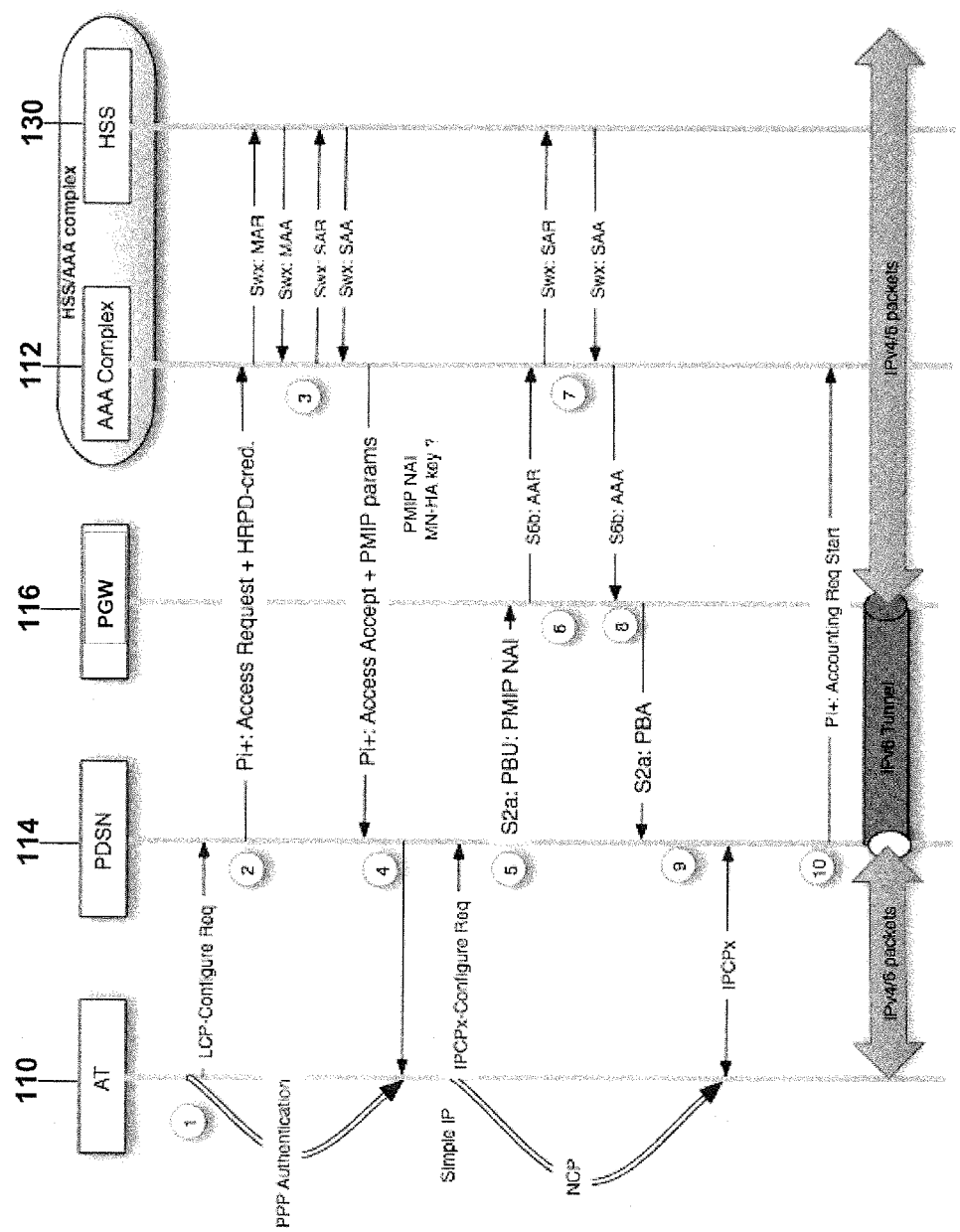
FIG. 4 illustrates a call flow for handling access terminal's accounting information in accordance with some embodiments.

FIG. 4 shows call flows for handling AT's accounting information in accordance with certain embodiments. In step 1, an AT 110 requests a PPP authentication to an access gateway 114. In this step, the AT 110 can establish A10 interface and service options (e.g. speech utilizing a particular codec, type of traffic such as a short message service, a connection type such as IP), and also negotiate PAP/CHAP with the access gateway 114. In step 2, the access gateway 114 can send an Access-Request message, which may include PAP/CHAP credentials, to RADIUS in the 3GPP2 AAA complex 122. The PAP/CHAP credentials can include HRPD NAI. The access request can also indicate whether the AT 110 supports connection to EPC. In step 3, AAA 112 can authenticate the AT 110 and its PAP/CHAP connection with the access gateway 114. In this step, AAA 112 can query HSS 130 in the 3GPP network using 3GPP2 Diameter 124. The NAI included in this query message can be AT's international mobile subscriber identity (IMSI), which can be obtained from the HRPD NAI. During step 3, two transactions can be carried out: MAR/MAA and SAR/SAA. During the MAR/MAA transaction, authentication and key agreement (AKA) vectors may not be fetched. Through the SAR/SAA transaction, AAA 112 can fetch the user profile subscription from HSS 130. In step 4, AAA 112 accepts the Access-Request message from the access gateway 114 and sends an acknowledgment message (e.g. Access-Accept message) to the access gateway 114. This acknowledgment message can include HRPD parameters, PMIPv6 parameters, the access gateway IP address, and NAI to be used for PMIPv6. The access gateway 114 then completes the PPP session establishment.

In step 5, the AT 110 can start the PPP network control protocol (NCP) phase for SIP. In this step, the access gateway 114 sends a PBU to an anchor gateway 116 using parameters included in the acknowledgment message from AAA 112. In step 6, the anchor gateway 116 receives the PBU from the access gateway 114 and can request AAA 112 to update the anchor gateway address information. The anchor gateway 116 can also optionally receive authorization attributes as defined in 3GPP TS 29.273. In step 7, AAA 112 can request HSS 130, using the SAR/SAA transaction as defined in 3GPP TS 29.273, to register the anchor gateway. In step 8, AAA 112 can send PBA to the anchor gateway 116, which subsequently relays the received PBA to the access gateway 114 as defined in 3GPP TS 29.275. By step 9, the access gateway 114 completes the PPP IPCP by sending the assigned IP address to the AT 110. In step 10, the access gateway 114 can send a message to AAA 112 to signal the start of the session, which starts the RADIUS Accounting.

Figure 5:
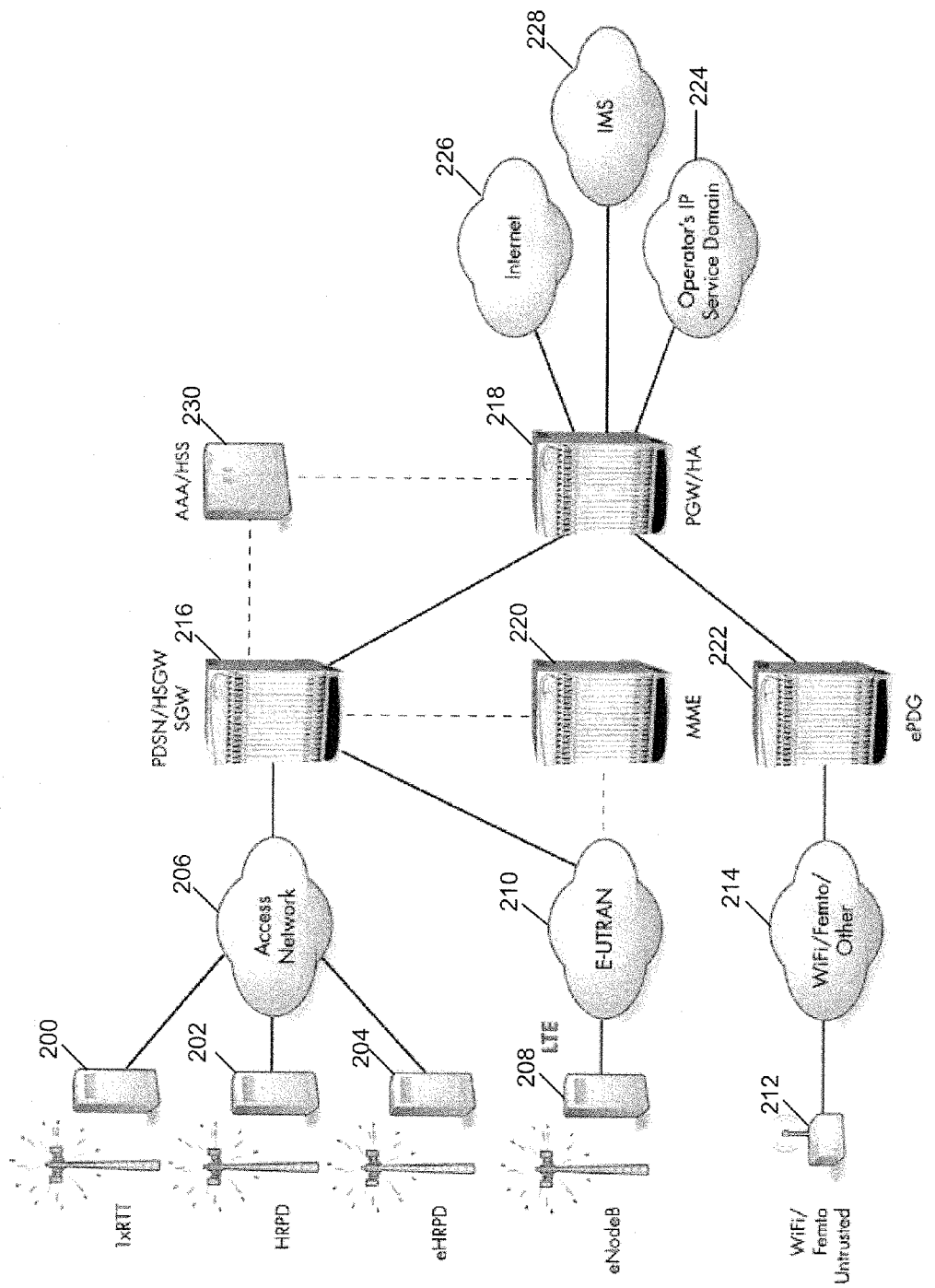
FIG. 5 illustrates a communication network that includes an interworking gateway in accordance with certain embodiments.

FIG. 5 illustrates a communication network that includes an interworking gateway in accordance with certain embodiments. FIG. 5 includes a number of radio access technologies such as a 1xRTT transceiver 200, a high-rate packet data (HRPD) transceiver 202, and an evolved high-rate packet data (eHRPD) transceiver 204, each of which can connect to an access network 206. An evolved Node B (eNodeB) transceiver 208 is an LTE network radio network component that connects to an Evolved UMTS Terrestrial Radio Access Network (E-UTRAN) 210. Other radio access technologies such as WiFi, Femto, WiMAX, or any other radio spectrum technology can use transceiver 212 to connect to the network using a broadband or other access network.

The access network 206 can communicate with an access gateway 216 that implements a combination of functionalities such as a packet data serving node (PDSN), a HRPD serving gateway (HSGW), and a serving gateway (SGW). In operation, the PDSN functionality can be used with 1xRTT 200, the HSGW functionality can be used with HRPD 202 and eHRPD 204, and the SGW functionality can be used with the eNodeB 208. The access gateway 216, as described above, can interconnect network components that would not otherwise operate together. This can allow a 3GPP or 3GPP2 mobile device to communicate with an evolved packet core through the use of protocols such as proxy mobile IP. The access gateway 216 can communicate with an anchor gateway 218, which can implement a packet data network gateway (PGW) and a Home Agent (HA), and a mobility management entity (MME) 220. On the access network side, the anchor gateway 218 can also communicate with an evolved packet data gateway (ePDG) 222 which provides connectivity to the WiFi/Femto/other transceiver 212. On the packet core side, the anchor gateway can communicate with the operator's IP service domain 224, the internet 226, and IP multimedia subsystem (IMS) 228. An authentication, authorization, and accounting (AAA) server/home subscriber server (HSS) 230 can communicate with the access gateway 216, the anchor gateway 218, or both.

The Home Subscriber Server (HSS) can be a master user database that supports IMS network entities that handle calls. The HSS stores subscription-related information (subscriber profiles), performs authentication and authorization of the user, and can provide information about the subscriber's location and IP information. AAA server can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. AAA/HSS 230 can provide 3GPP2 RADIUS and DIAMETER functions as well as 3GPP AAA and HSS functions in some embodiments.

The LTE communication network includes a PDN gateway (PGW), a serving gateway (SGW), an E-UTRAN (evolved-UMTS terrestrial radio access network), and a mobility management entity (MME). The SGW sits in the user plane where it forwards and routes packets to and from the eNodeB and Packet Data Network Gateway (PGW). The SGW also serves as the local mobility anchor for inter-eNodeB handover and mobility between 3GPP networks. The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept.

The ePDG 222 is responsible for interworking between the EPC and fixed non-3GPP access technologies such as a WiFi, WiMAX, LTE metro, and femtocell access networks. The ePDG 222 can use IPSec/IKEv2 to provide secure access to the EPC network. Optionally, the ePDG can use Proxy Mobile IPv6 (PMIPv6) to interact with the Packet Data Network Gateway (PGW) when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

The MME resides in the EPC control plane and manages session states, authentication, paging, mobility with 3GPP 2G/3G nodes, roaming, and other bearer management functions. The MME can be a standalone element or integrated with other EPC elements, including the Serving Gateway (SGW), Packet Data Network Gateway (PGW), and Release 8 Serving GPRS Support Node (SGSN). The MME can also be integrated with 2G/3G elements, such as the Serving GPRS Support Node (SGSN) and Gateway GPRS Support Node (GGSN). This integration is the key to mobility and session management interworking between 2G/3G and 4G mobile networks.

Figure 6:
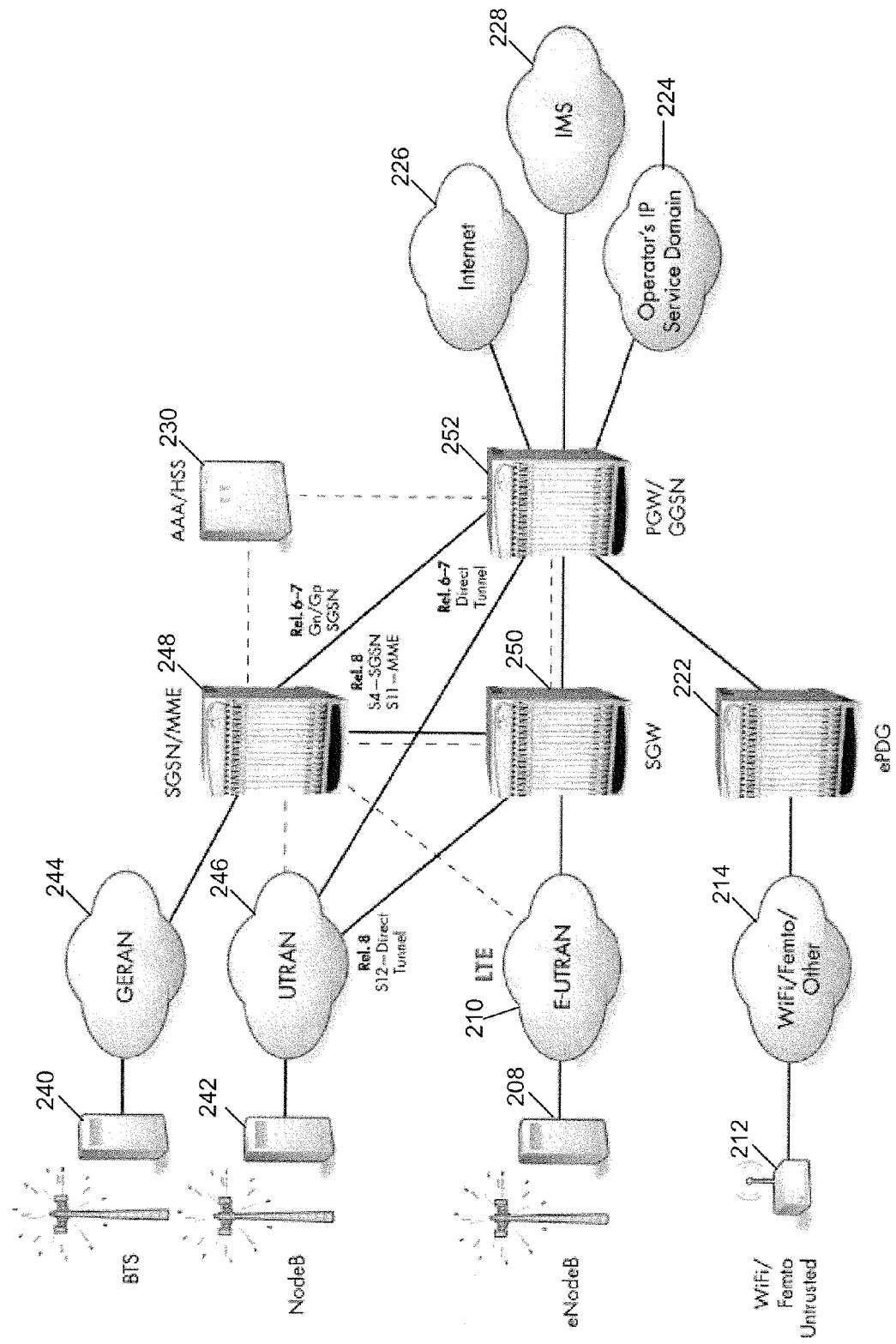
FIG. 6 illustrates a communication network that implements the interworking gateway with legacy universal mobile telecommunications systems (UMTS) network devices in accordance with certain embodiments.

FIG. 6 illustrates a communication network that implements the interworking gateway with legacy universal mobile telecommunications systems (UMTS) network devices in accordance with certain embodiments. The legacy transceivers include base transceiver station (BTS) 240 and NodeB transceiver 242. The BTS 240 can communicate with a GSM EDGE Radio Access Network (GERAN) 244 and the NodeB 242 can communicate with a UMTS terrestrial radio access network (UTRAN) 246. The serving GPRS support node (SGSN) can be implemented on a gateway 248 with a mobility management entity (MME). The GERAN 244 can communicate through the SGSN functionality on gateway 248 to serving gateway (SGW) 250 or gateway GPRS support node (GGSN)/PGW 252.

Figure 7:
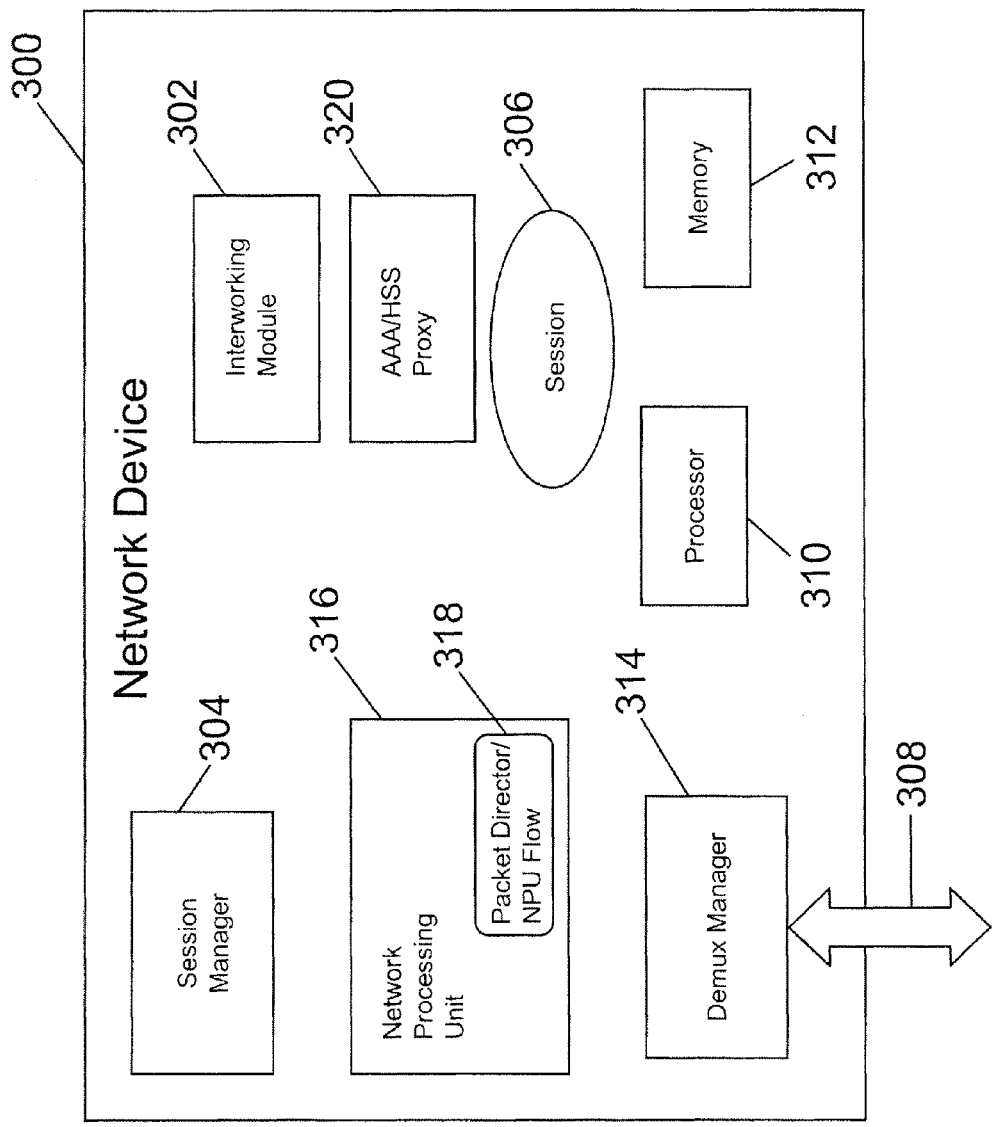
FIG. 7 illustrates a logical view of a gateway in accordance with some embodiments.

The interworking mechanism can be implemented on a network device providing a gateway functionality. The network device can provide the advantages operators enjoy from the platform including quality performance in terms of subscriber/session density, transaction rates as well as traffic throughput. The platform also provides hardware and software resilience with no single point of failure as well as session recovery for even higher service availability. FIG. 7 illustrates a logical view of a network device in accordance with certain embodiments. The network device 300 includes a interworking module 302, a session manager 304, a session 306, an interface 308, a processor 310, and a memory 312, demux manager 314, a network processing unit (NPU) 316, a packet director/NPU flow 318, and an AAA/HSS proxy 320.

The interworking module 302 can be implemented in software using memory 312 such as a computer readable medium, a programmable read only memory (PROM), or flash memory. The software can run on a processor 310 that executes instructions or computer code. The interworking mechanism 300 may also be implemented in hardware using an application specific integrated circuit (ASIC), programmable logic array (PLA), or any other integrated circuit. The interworking module can establish a communication channel based on the mode of operation. The mode of operation can include technologies such as CDMA, UMTS, and LTE. The interworking module can vary the protocols used in establishing the connection depending on the technology used by the mobile device. In some embodiments, the interworking module makes a determination based on parameters and a mode indicator provided by a mobile device. The type of address that is assigned to a mobile can depend on the mode and parameters.

A session manager 304 can provide management of a session on the gateway. A session 306 can include one or more connections for a subscriber in the service provider's network. The session 306 can include information relating to the mobile device as well as to each data connection established with the mobile device over the network. The session 306 can include policy information, billing information, services to be provided, quality of service (QoS) information, and any other applicable information. Each session can share the processor 310 and memory 312 resources on the network device. The session manager 312 can work with other modules and components in the network device to ensure the session is handled appropriately. The session manager 312 can assign resources, perform tasks, and log information regarding the session. The demux manager 314 can select a session manager 304 for incoming requests and can route control messages to the appropriate a session manager for a particular subscriber.

An interface 308 can provide an input and/or output mechanism to communicate with the gateway. The interface 308 can allow communication with user equipment, domain name servers, other gateways, as well as to send and receive data in the network. The interface 308 can be implemented in hardware to send and receive signals in a variety of mediums, such as optical, copper, and wireless and in a number of different protocols some of which may be non-transient signals. The network processing unit 316 can be used to select packets based on a set of criteria. The network processing unit 316 can perform deep packet inspection or shallow packet inspection on one or more packets to redirect one or more packets within the network device. The network processing unit 316 includes a packet director/NPU flow 318 that can be setup to direct a particular packet flow to a module or component in the network device for processing. AAA/HSS proxy 320 is a module that provides communication with 3GPP or 3GPP2 devices for accounting, authentication, and authorization services. This proxy can manage or send updates to the 3GPP2 and/or 3GPP AAA/HSS. In some embodiments, the proxy communicates through a diameter or radius server to communicate with a 3GPP device.

User Equipment and Network Device

The mobile device or user equipment described above can communicate with a plurality of radio access networks using a plurality of access technologies. The mobile device can be a smartphone offering advanced capabilities such as word processing, web browsing, gaming, e-book capabilities, an operating system, and a full keyboard. Operating systems that can be used on the mobile device include Symbian OS, iPhone OS, RIM's BlackBerry, Windows Mobile, Linux, Palm WebOS and Android. The screen may be a touch screen that can be used to input data to the mobile device and the screen can be used instead of the full keyboard. The mobile device can also keep global positioning coordinates or other location information in its stack or memory, which can be sent to the network for use by the selection mechanism.

In some embodiments, the mobile device is capable of connecting to a 3GPP or a 3GPP2 network based on protocols of one of the networks. In other embodiments, the mobile device can include one or more antennas that are configured to transmit and receive data on a radio frequency with a plurality of radio access networks and/or access technologies. The one or more antennas can be used to send and receive data flows over a plurality of access technologies. For example, the at least one antenna can receive the first data flow and the second data flow on a first access technology, and also receive the first data flow on the first access technology and the second data flow on the second access technology at the same time. The mobile device can be configured with one or more processors that process instructions to modulate data on a first access technology and a second access technology and to process a first data flow and a second data flow received from the at least one antenna. The processors can also communicate with a computer readable medium used for storage such as programmable read only memory. The processor can be any applicable processor such as a system-on-a-chip that combines a CPU, an application processor, and flash memory. The processor can also be used in combination with the antenna to attach to a first and a second access technology simultaneously and to receive a data flow from a first access technology and a data flow from a second access technology at the same time. The processor can also compile user preferences regarding how certain types of data flows are transmitted to the mobile device and communicate these preferences to the network, such as the access gateway.

The interworking mechanism described above can be implemented on a network device providing a gateway functionality. The network device can perform multiple and different integrated functionalities. In some embodiments, a packet data network gateway (PGW), a serving gateway (SGW), Gateway General packet radio service Support Node (GGSN), a serving GPRS support node (SGSN), an HRPD serving gateway (HSGW), a packet data serving node (PDSN), a foreign agent (FA), or home agent (HA) can be implemented on a gateway. Other types of functionalities can also be implemented on a gateway in other embodiments are a packet data inter-working function (PDIF), an access service network gateway (ASNGW), a base station, a access network, a User Plane Entity (UPE), an IP Gateway, an mobility management entity (MME), a packet data network gateway (PGW), a serving gateway (SGW), a session initiation protocol (SIP) server, a proxy-call session control function (P-CSCF), and an interrogating-call session control function (I-CSCF). In certain embodiments, one or more of the above-mentioned other types of functionalities are integrated together or provided by the same network device.

The network device can also support sessions originated from a Femto base station, which would connect to the gateway using a broadband network. A person or corporation may use a Femto base station in a home or business to support one or more ATs. The network device can provide trigger based traffic management during a handoff from a Femto base station to a macro base station, while maintaining traffic management for the user equipment. If the network device based gateway is implementing an offload gateway, then the gateway can be implemented as any combination of the following including an xGSN, an xGW, an xGW-SGW, and an xGW-PGW.

Figure 8:
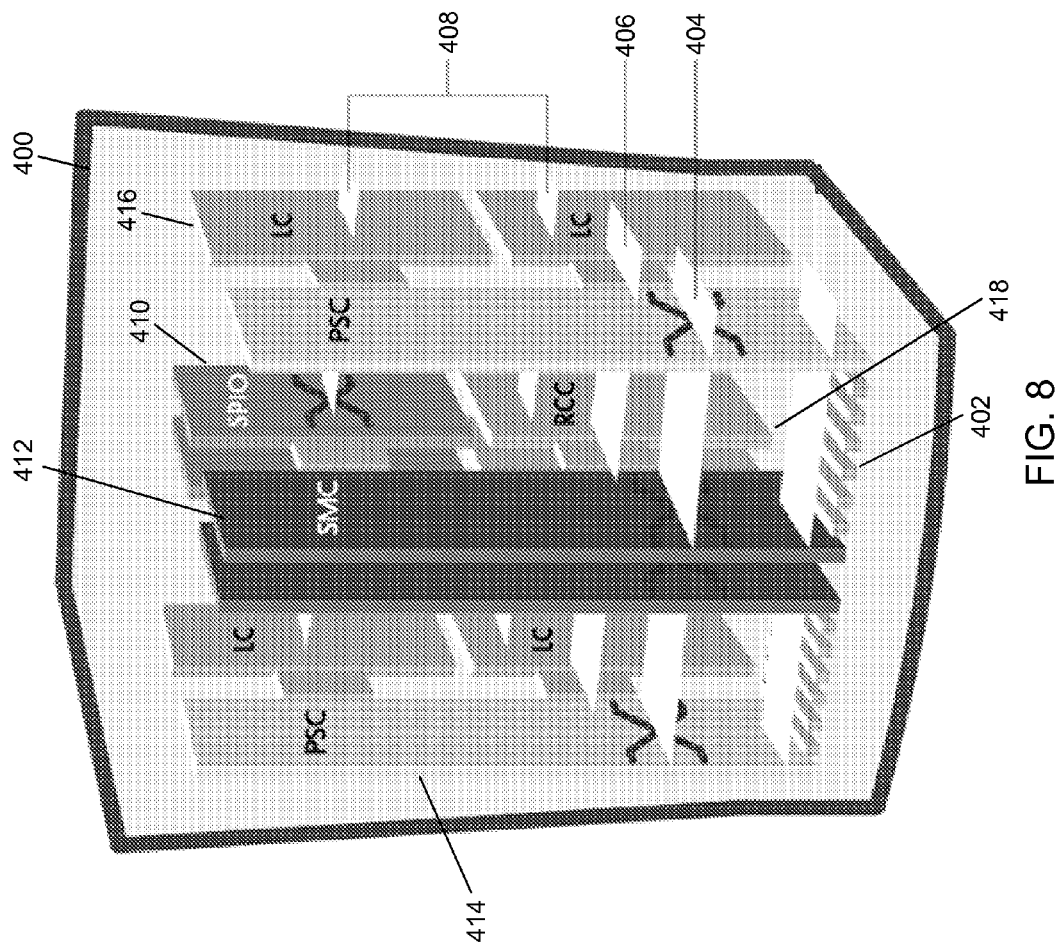
FIG. 8 illustrates the implementation of a network device in accordance with some embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 8 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device.

The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group of users another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a user equipment, the session subsystem can setup a MIPv4 termination and setup a PMIPv6 session towards the core network. A session manager can track the mapping of the sessions and processing to provide the emulation and inter-working between the networks. A database can also be used to map information between the sessions, and store, for example, NAI, HoA, AE information in some embodiments.

Figure 9:
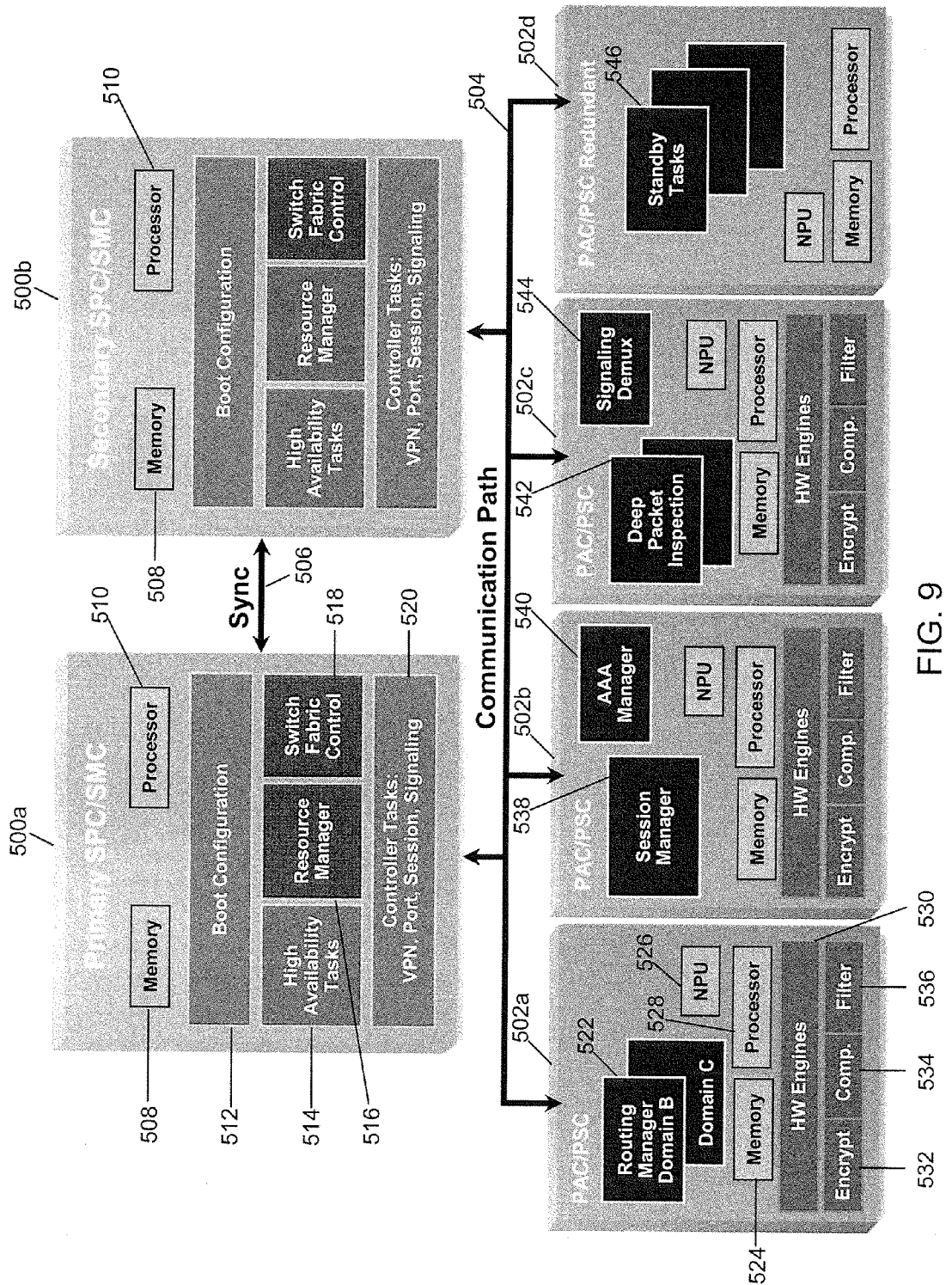
FIG. 9 illustrates a logical view of the software architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 9 illustrates a logical view of the software architecture of a network device in accordance with certain embodiments. As shown, the software and hardware can be distributed within the network device and across different circuit boards, processors, and memory. FIG. 9 includes a primary switch processor card (SPC)/system management card (SMC) 500a, a secondary SPC/SMC 500b, PAC/PSC 502a-502d, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manage and control the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for user equipment.

The PAC/PSC 502 are high-speed processing cards that are designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 are also capable of running a variety of tasks or modules. PAC/PSC 502a provides routing managers 522 with each covering routing of a different domain. PAC/PSC 502b provides a session manager 538 and an AAA manager 540. The session manager 538 manages one or more sessions that correspond to one or more user equipment. A session allows a user equipment to communicate with the network for voice calls and data. AAA manager 540 manages accounting, authentication, and authorization with an AAA server in the network. PAC/PSC 502 provides a deep packet inspection task 542 and a signaling demux 544. The deep packet inspection task 542 provides inspection of packet information beyond layer 4 for use and analysis by the network device. The signaling demux 544 can provide scalability of services in combination with other modules. PAC/PSC 502d provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, LTE functionality such as a PDN gateway can be combined or co-located with the MME.

We claim:

1. An access gateway comprising:
an interface capable of operating in accordance with a plurality of modes of operation, including a 3GPP operating mode and a 3GPP2 operating mode, wherein the interface is configured to:
receive a request from a mobile device for a service;
determine a mode of operation for the mobile device by inspecting the request;
if the mobile device is determined to be operating in the 3GPP operating mode, select an anchor gateway that can provide packet data network gateway (PGW) functionalities based on information obtained from inspecting the request; and provide mobility access gateway (MAG) functionalities;

if the mobile device is determined to be operating in the 3GPP2 operating mode, select an anchor gateway that can provide home agent (HA)/local mobility anchor (LMA) functionalities based on the information obtained from the request; and provide packet data serving node (PDSN) functionalities;

an interworking module configured to establish a proxy mobile internet protocol (PMIP) connection with the selected anchor gateway based on the determined mode of operation and provide an internet protocol (IP) address to the mobile device based on the mode of operation and parameters associated with the mode of operation; and an authentication, authorization, and accounting (AAA) proxy module that is configured to communicate with a 3GPP2 AAA server in the 3GPP2 operating mode and is configured to communicate with a 3GPP AAA server in the 3GPP operating mode.

2. The gateway of claim 1, wherein the interworking module is further configured to provide a registration request (RRQ) or a proxy binding update (PBU) message that includes an indication of the mode of operation.

3. The gateway of claim 1, wherein the AAA proxy module communicates with the 3GPP AAA server using a S6b interface.

4. The gateway of claim 1, wherein the interface communicates with the mobile device in accordance with client mobile IP (CMIP) or simple IP (SIP).

5. The gateway of claim 1, wherein the interworking module provides a proxy binding acknowledgement message that provides a packet data network type.

6. The gateway of claim 1, wherein the interworking module provides for a plurality of packet data network (PDN) connections and IP addresses with the mobile device.

7. The gateway of claim 1, wherein the 3GPP operating mode includes one or more of GSM, UMTS, HSPA, and LTE, and the 3GPP2 operating mode includes one or more of IS-95, CDMA 2000, and EVDO.

8. The gateway of claim 1, wherein the authentication, authorization, and accounting (AAA) proxy module communicates with the 3GPP AAA server in the 3GPP operating mode via a 3GPP2 proxy.

9. A method comprising:
receiving a request from a mobile device for a service at an access gateway;
determining a mode of operation for the mobile device by inspecting the request, wherein the mode of operation includes 3GPP and 3GPP2;
if the mode of operation for the mobile device is determined to be 3GPP,
selecting at the access gateway an anchor gateway that can provide packet data network gateway (PGW) functionalities based on information obtained from inspecting the request; and
configuring the access gateway for providing mobility access gateway (MAG) functionalities;
if the mode of operation for the mobile device is determined to be 3GPP2,
selecting at the access gateway an anchor gateway that can provide home agent (HA)/local mobility anchor (LMA) functionalities based on the information obtained from inspecting the request; and
configuring the access gateway for providing packet data serving node (PDSN) functionalities;
establishing a connection from the access gateway to the selected anchor gateway using a proxy mobile internet protocol (PMIP), where the type of connection established is dependent on the mode of operation;
providing an IP address to the mobile device based on the mode of operation and the parameters associated with the mode of operation; and
communicating with an authentication, authorization, and accounting (AAA) server operating in accordance with the mode of operation.

10. The method of claim 9, further comprising providing a proxy binding update (PBU) message that includes an indication of mode of operation.

11. The method of claim 9, wherein the communicating with an authentication, authorization, and accounting (AAA) server includes communicating over a S6b interface.

12. The method of claim 9, further comprising communicating with the mobile device in accordance with client mobile IP (CMIP) or simple IP (SIP) from the access gateway.

13. The method of claim 9, further comprising providing a proxy binding acknowledgement (PBA) message that includes a packet data network (PDN) type.

14. The method of claim 9, further comprising providing a plurality of packet data network (PDN) connections and IP addresses with the mobile device.

15. A non-transitory computer readable medium having executable instructions operable to cause an as apparatus capable of operating in a plurality of modes of operation to:
receive a request from a mobile device for a service;
determine a mode of operation for the mobile device by inspecting the request, wherein the mode of operation includes 3GPP and 3GPP2;
if the mode of operation for the mobile device is determined to be 3GPP,
select a network element that can provide packet data network gateway (PGW) functionalities based on information obtained from inspecting the request; and
provide mobility access gateway (MAG) functionalities;
if the mode of operation for the mobile device is determined to be 3GPP2,
select a network element that can provide home agent (HA)/local mobility anchor (LMA) functionalities based on the information obtained from inspecting the request; and
provide packet data serving node (PDSN) functionalities;
establish a connection to the selected network element using a proxy mobile internet protocol (PMIP), where the type of connection established is dependent on the mode of operation;
provide an IP address to the mobile device based on the mode of operation and parameters associated with the mode of operation; and
communicate with an authentication, authorization, and accounting (AAA) server operating in accordance with the mode of operation.

16. The computer readable medium of claim 15, further comprising providing a plurality of packet data network (PDN) connections and IP addresses with the mobile device.

17. The computer readable medium of claim 15, further comprising providing a proxy binding acknowledgement (PBA) message that includes a packet data network (PDN) type.

18. The gateway of claim 1, wherein the selected anchor gateway determines the mode of operation using a port that is used for the PMIP connection.

19. The method of claim 9, wherein the selected anchor gateway determines the mode of operation using a port that is used for the connection established using the PMIP.

20. The computer readable medium of claim 15, wherein the selected network element determines the mode of operation using a port that is used for the connection established using the PMIP.

* * * * *